United States Patent
Batra et al.

(10) Patent No.: US 9,230,578 B2
(45) Date of Patent: Jan. 5, 2016

(54) MULTIPLE READERS FOR HIGH RESOLUTION AND SNR FOR HIGH AREAL DENSITY APPLICATION

(71) Applicant: HGST Netherlands B.V., Amsterdam (NL)

(72) Inventors: Sharat Batra, Plymouth, MN (US); Jonathan D. Coker, Rochester, MN (US); Travis R. Oenning, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/138,804

(22) Filed: Dec. 23, 2013

(65) Prior Publication Data

US 2015/0179193 A1    Jun. 25, 2015

(51) Int. Cl.
*G11B 5/39* (2006.01)

(52) U.S. Cl.
CPC ............ *G11B 5/3954* (2013.01); *G11B 5/3909* (2013.01)

(58) Field of Classification Search
CPC ............ G11B 2005/3996; G11B 5/3954; G11B 5/3932; G11B 5/3945; G11B 5/3948; G11B 5/3951; G11B 5/3909
USPC .......... 360/314–316, 319, 324–342.2
See application file for complete search history.

(56) References Cited

U.S. PATENT DOCUMENTS

| | | | |
|---|---|---|---|
| 3,860,965 A * | 1/1975 | Voegeli ......................... | 360/315 |
| 4,179,720 A * | 12/1979 | Miura ........................... | 360/315 |
| 4,447,839 A * | 5/1984 | Desserre et al. ............. | 360/319 |
| 5,309,305 A | 5/1994 | Nepela et al. | |
| 5,576,915 A * | 11/1996 | Akiyama et al. ............. | 360/314 |
| 5,668,688 A * | 9/1997 | Dykes et al. ................ | 360/324.1 |
| 5,701,222 A * | 12/1997 | Gill et al. ...................... | 360/314 |
| 5,825,595 A * | 10/1998 | Gill ............................... | 360/314 |
| 6,259,586 B1 * | 7/2001 | Gill ............................. | 360/324.2 |
| 6,275,363 B1 | 8/2001 | Gill | |
| 6,473,275 B1 | 10/2002 | Gill et al. | |
| 6,580,587 B1 * | 6/2003 | Everitt ......................... | 360/324 |
| 6,680,827 B2 * | 1/2004 | Li et al. ........................ | 360/314 |
| 6,717,780 B2 | 4/2004 | Hiramoto et al. | |
| 6,999,285 B2 * | 2/2006 | Gill .............................. | 360/314 |
| 7,324,310 B2 | 1/2008 | Gill | |
| 7,511,926 B2 * | 3/2009 | Gill .............................. | 360/314 |

(Continued)

FOREIGN PATENT DOCUMENTS

KR    2001027694 A    *    4/2001

OTHER PUBLICATIONS

Ching Tsang et al.; "Gigabit Density Recording Using Dual-Element MR/Inductive Heads on Thin-Film Disks"; IEEE Transactions on Magnetics, vol. 26, No. 5, Sep. 1990, 5 pages.

*Primary Examiner* — Will J Klimowicz
(74) *Attorney, Agent, or Firm* — Patterson & Sheridan, LLP

(57) ABSTRACT

The present invention generally relates to a read head in a magnetic recording head. The read head utilizes two reader elements that are stacked in the down track direction within the same read gap to improve resolution and SNR by combining the signals from the two reader elements. The output waveform from each read element is asymmetric in the down track direction; however, by use of equalizer settings and waveform combining the algorithm in signal processing, the combined waveform has a similar or better resolution and higher SNR compared to a single read element in a smaller read gap.

19 Claims, 8 Drawing Sheets

(56) References Cited

U.S. PATENT DOCUMENTS

| | | | |
|---|---|---|---|
| 7,551,393 B2* | 6/2009 | Biskeborn et al. | 360/121 |
| 7,633,724 B2 | 12/2009 | Gill | |
| 8,133,363 B2 | 3/2012 | Lin et al. | |
| 8,824,106 B1* | 9/2014 | Garfunkel et al. | 360/316 |
| 8,873,204 B1* | 10/2014 | Gao et al. | 360/319 |
| 8,891,207 B1* | 11/2014 | Li et al. | 360/316 |
| 2003/0123198 A1* | 7/2003 | Sugawara et al. | 360/314 |
| 2003/0184918 A1* | 10/2003 | Lin et al. | 360/314 |
| 2004/0057162 A1* | 3/2004 | Gill | 360/314 |
| 2005/0068683 A1* | 3/2005 | Gill | 360/314 |
| 2005/0068684 A1* | 3/2005 | Gill | 360/314 |
| 2006/0002032 A1* | 1/2006 | Li et al. | 360/315 |
| 2008/0112095 A1 | 5/2008 | Carey et al. | |
| 2008/0144228 A1* | 6/2008 | Funayama | 360/314 |
| 2009/0059437 A1* | 3/2009 | Gill et al. | 360/314 |
| 2009/0122450 A1* | 5/2009 | Wang et al. | 360/324.2 |
| 2009/0207531 A1* | 8/2009 | Shiimoto et al. | 360/316 |
| 2012/0280774 A1* | 11/2012 | Singleton et al. | 335/301 |
| 2012/0281320 A1* | 11/2012 | Singleton et al. | 360/319 |

* cited by examiner

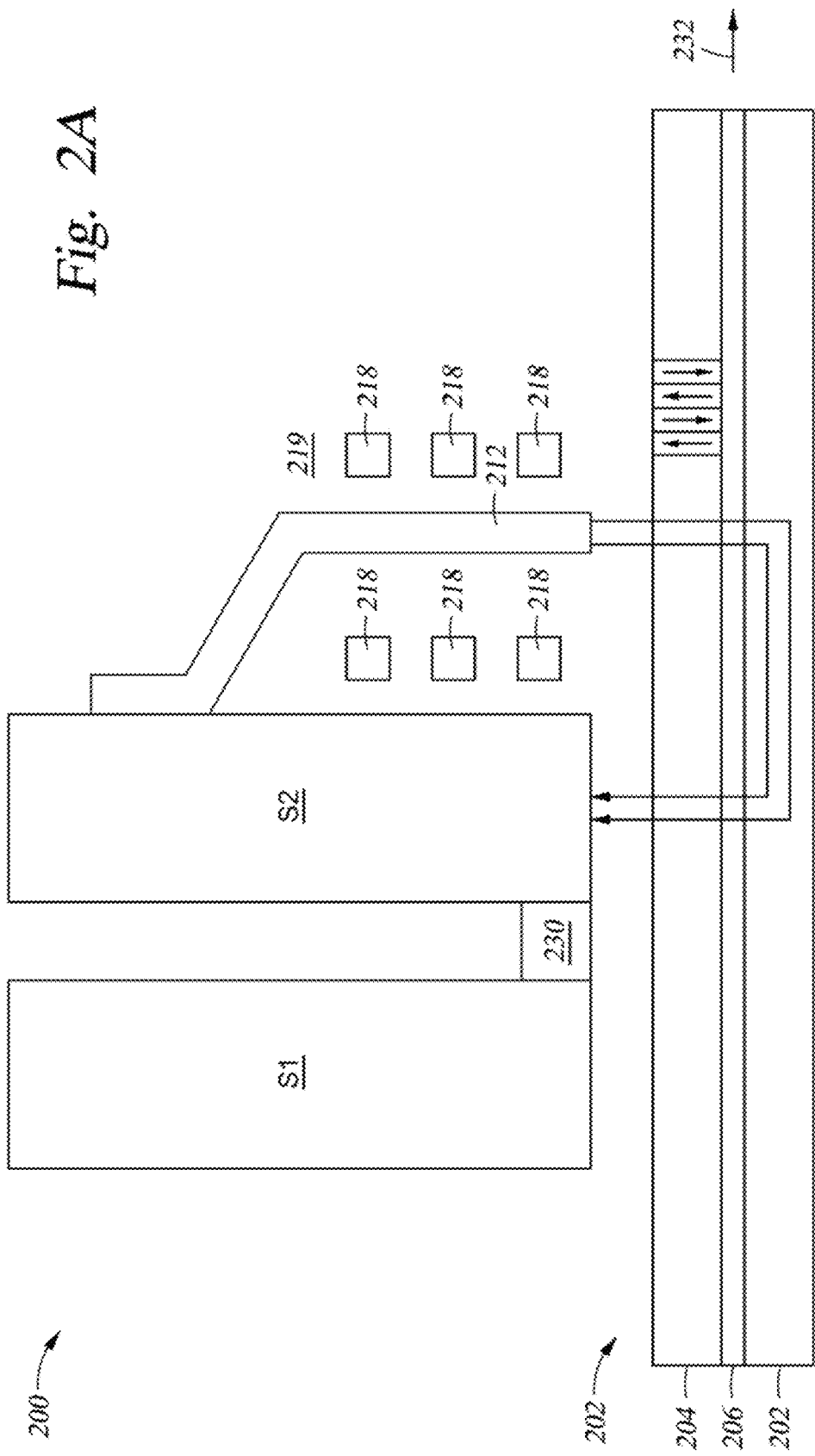

272 ↘

| 286 |
| 284 |
| 312 |
| 310 |
| 308 |
| 306 |
| 304 |
| 302 |

| 362 |
| 360 |
| 358 |
| 356 |
| 354 |
| 352 |
| 278 |
| 276 |

| 286 |
| 284 |
| 372 |
| 310 |
| 308 |
| 306 |
| 304 |
| 302 |

| 362 |
| 360 |
| 358 |
| 356 |
| 354 |
| 382 |
| 278 |
| 276 |

Fig. 3D

MULTIPLE READERS FOR HIGH RESOLUTION AND SNR FOR HIGH AREAL DENSITY APPLICATION

BACKGROUND OF THE INVENTION

1. Field of the Invention

Embodiments of the present invention generally relate to a magnetic read head for use in a hard disk drive.

2. Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider towards the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing, the write and read heads are employed for writing magnetic transitions corresponding to host data. The read and write heads are connected to a signal processing circuitry that operates according to a computer program to implement the writing and reading functions.

Improved signal to noise ratio (SNR) in magnetic recording involves improved reader resolution in the down-track and cross-track directions to enable reading the closely packed transitions on a narrow track. Reader resolution and SNR is mostly determined by the reader sensitivity (dR/R), RA product and shield to shield spacing. Most of the gains in readers have come from continuous improvement in the film stack and reduction in shield to shield spacing. The material limits are just about reached.

Therefore, there is a need in the art for an improved read head.

SUMMARY OF THE INVENTION

The present invention generally relates to a read head in a magnetic recording head. The read head utilizes two reader elements that are stacked in the down track direction within the same read gap to improve resolution and SNR by combining the signals from the two reader elements. The output waveform from each read element is asymmetric in the down track direction; however, by use of equalizer settings and waveform combining the algorithm in signal processing, the combined waveform has a similar or better resolution and higher SNR due to noise averaging compared to a single read element in a smaller read gap.

In one embodiment, a magnetic read head comprises: a first shield layer; a second shield layer; a first sensor element disposed between the first shield layer and the second shield layer; and a second sensor element, separate and distinct from the first sensor element, disposed between the first shield layer and the second shield layer. A magnetic or nonmagnetic conducting material may be used as a center lead that is coupled between the first and second sensor elements.

In another embodiment, a magnetic read head comprises: a first shield layer; a first sensor element disposed on the first shield layer; a center lead disposed on the first sensor element; a second sensor element disposed on the center lead; and a second shield layer disposed on the second sensor element.

In another embodiment, a magnetic read head comprises: a first shield layer; a first sensor element disposed on the first shield layer, the first sensor element comprising a first free magnetic layer, wherein the first free magnetic layer is disposed a first distance from the first shield layer; a second shield layer disposed over the first sensor element; and a second sensor element disposed between the first sensor element and the second shield layer, the second sensor element having a second free layer, wherein the second free layer is disposed a second distance from the second shield layer and wherein the second distance is substantially equal to the first distance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2A is a side view of a read/write head and magnetic disk of the disk drive of FIG. 1, according to one embodiment of the invention.

FIG. 3A is a schematic cross-sectional illustration of a bottom TMR according to one embodiment.

FIG. 3B is a schematic cross-sectional illustration of a top TMR according to one embodiment.

FIG. 3C is a schematic cross-sectional illustration of a bottom CPP GMR according to one embodiment.

FIG. 3D is a schematic cross-sectional illustration of a top CPP GMR according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention generally relates to a read head in a magnetic recording head. The read head utilizes two reader elements that are stacked in the down track direction within the same read gap to improve resolution and SNR by combining the signals from the two reader elements. The output waveform from each read element is asymmetric in the down track direction; however, by use of equalizer settings and waveform combining, the combined waveform has a similar or better resolution and higher SNR compared to a single read element in a smaller read gap. The read heads have a resolution that is defined by the total distance between the free layer and the nearest shields. The read heads readers discussed herein are in contrast to the resolution for a single read head which is defined as the distance between the top and bottom shields.

Figure 1:
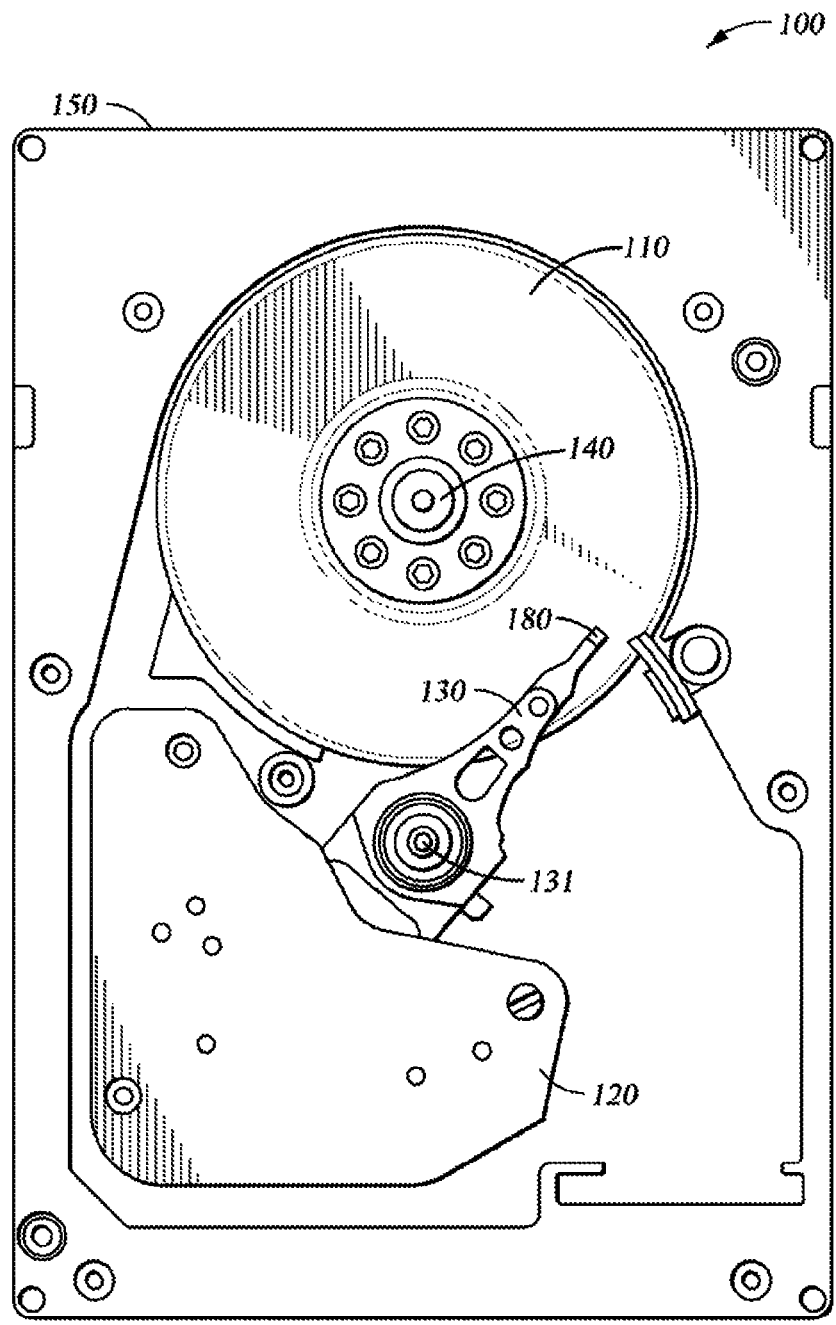
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks 110, and spindle motor 140 affixed in a chassis 150. The one or more magnetic disks 110 may be arranged vertically as illustrated in FIG. 1. Moreover, the one or more magnetic disks 110 may be coupled with the spindle motor 140.

Magnetic disks 110 may include circular tracks of data on both the top and bottom surfaces of the disk. A magnetic head 180 mounted on a slider may be positioned on a track. As each disk spins, data may be written on and/or read from the data track. Magnetic head 180 may be coupled to an actuator arm 130 as illustrated in FIG. 1. Actuator arm 130 may be configured to swivel around actuator axis 131 to place magnetic head 180 on a particular data track.

FIG. 2A is a fragmented, cross-sectional side view through the center of a read/write head 200 facing magnetic disk 202. The read/write head 200 and magnetic disk 202 may correspond to the magnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low coercivity magnetically permeable underlayer (PL) 206. The read/write head 200 includes an ABS, a magnetic write head and a magnetic read head, and is mounted such that its ABS is facing the magnetic disk 202. In FIG. 2A, the disk 202 moves past the head 200 in the direction indicated by the arrow 232. The RL 204 is illustrated with perpendicularly recorded or magnetized regions, with adjacent regions having magnetization directions, as represented by the arrows located in the RL 204. The magnetic fields of the adjacent magnetized regions are detectable by the sensing element 230 as the recorded bits. The write head includes a magnetic circuit made up of a main pole 212 and a thin film coil 218 shown in the section embedded in non-magnetic material 219.

Figure 2B:
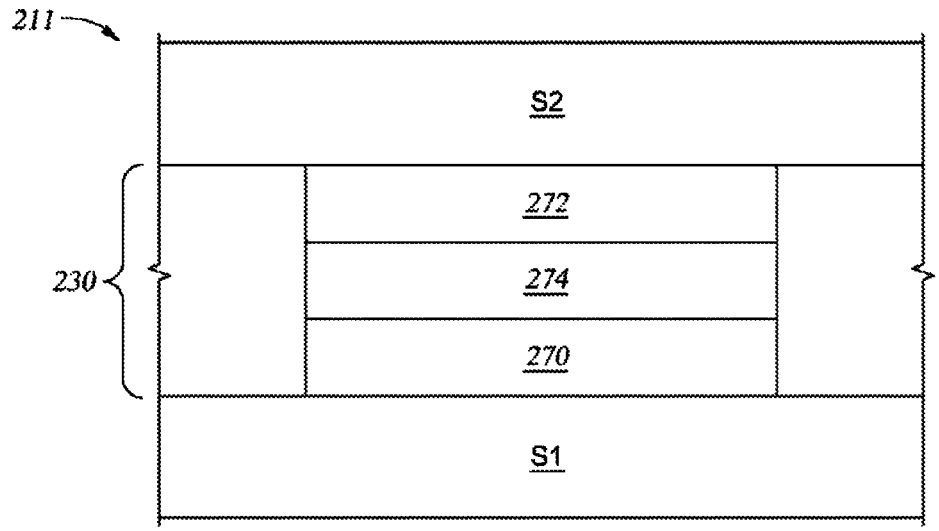
FIG. 2B is a schematic cross-sectional view of portions of a read head of FIG. 2A according to one embodiment of the invention.

FIG. 2B is a schematic cross-sectional view of portions of the CPP TMR read head according to one embodiment. The read head has two CPP TMR readers. The thickness of each layer, and the width of each layer, are for example only, and each layer may be thicker/thinner and/or wider/narrower. The read head includes a first shield layer S1 and a second shield layer S2 having the sensor structure 230 disposed therebetween. The first and second shield layers S1, S2 may comprise a ferromagnetic material. Suitable ferromagnetic materials that may be utilized include Ni, Fe, Co, NiFe, NiFeCo, NiCo, CoFe and combinations thereof.

The sensor structure 230 comprises a top TMR 270 adjacent the first shield layer S1 and a bottom TMR 272 adjacent the second shield layer S2. Between the top TMR 270 and the bottom TMR 272 is a center lead 274. The center lead 274 may comprise a conductive material such as copper, tantalum, tungsten or chrome. In one embodiment, the center lead 274 may comprise a magnetic material. The presence of the ferromagnetic shield/material reduces the asymmetric waveform; however, the combined waveform has a better resolution and lower noise compared to each individual waveform.

Figure 2C:
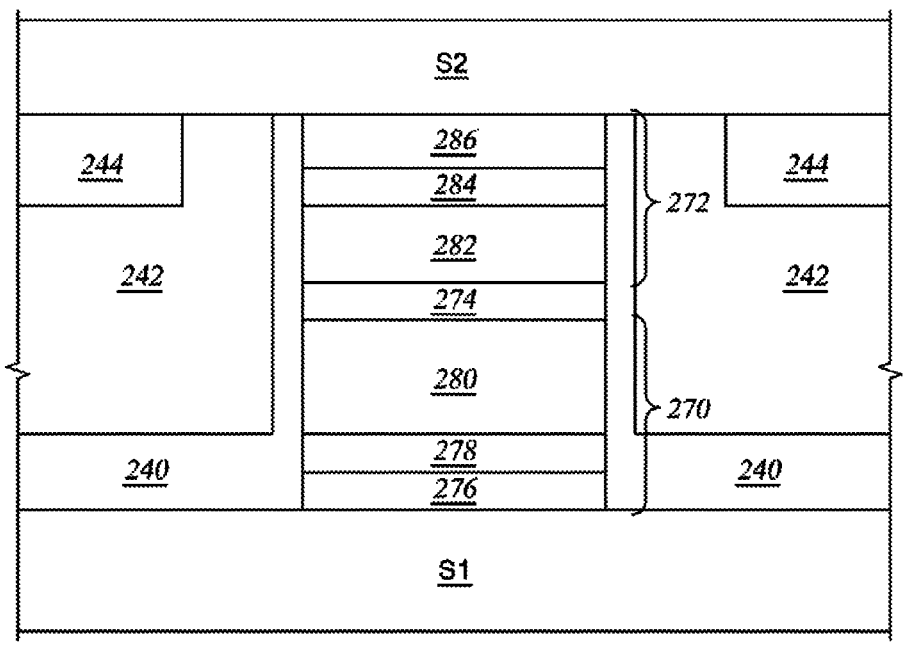
FIG. 2C is a schematic cross-sectional view of a current perpendicular to plane CPP read head according to one embodiment.

FIG. 2C is a schematic cross-sectional view of a CPP read according to one embodiment. The read head includes the first and second shield layers S1, S2 along with the center lead 274 disposed between the top TMR 270 and the bottom TMR 272. Bordering the sensor structure 230 is an insulating layer 240 that is disposed on the first shield layer S1 as well as the sidewalls of the sensor structure 230. The insulating layer 240 may comprise an insulating material such as aluminum oxide or silicon nitride. The insulating layer 240 may be deposited by well known deposition methods such as atomic layer deposition (ALD), chemical vapor deposition (CVD), and ion beam sputtering (IBD). On the insulating layer 240, a magnetic bias layer 242 is then deposited. The bias layer 242 may comprise a single material or laminated magnetic materials such as CoPt, FePt, high moment CoFe or NiFe. Once the bias layer 242 is deposited, a bias capping structure 244 is formed over the bias layer 242. In one embodiment, the bias capping structure 244 may comprise a multiple layered structure comprising one or combination of a tantalum layer, an iridium layer, a chromium layer, a titanium layer and a ruthenium layer.

The sensor structure 230 itself includes the center lead 274 disposed between the top TMR 270 and the bottom TMR 272. The top TMR 270 includes an underlayer 276 disposed on the first shield layer S1. The underlayer 276 comprises hafnium, ruthenium, tantalum and combinations thereof. The underlayer 276 has a thickness of between about 15 Angstroms and about 75 Angstroms. In some embodiments, the underlayer 276 may comprise multiple layers.

On the underlayer 276, a free layer 278 is deposited. The free layer 278 may comprise a single layer of magnetic material as shown or, in other embodiments, multiple layers. The free layer 278 may comprise Co, Fe, B, NiFe, CoFe, CoFeB and combinations thereof. The free layer 278 has a thickness of between about 15 Angstroms to about 75 Angstroms. The remainder 280 of the top TMR 270 is disposed on the free layer 278.

The bottom TMR 272 includes a capping layer 286, a free layer 284 and the remainder 282 of the bottom TMR 272. The remainder 282 of the bottom TMR 272 is disposed on the center lead 274. The free layer 284 is disposed on the remainder 282 and the capping layer 286 is disposed on the free layer 284 and below the second shield S2. The capping layer 286 comprises hafnium, ruthenium, tantalum or combinations thereof. The capping layer 286 has a thickness of between about 15 Angstroms and about 75 Angstroms. In some embodiments, the capping layer 286 may comprise multiple layers. The free layer 284 may comprise a single layer of magnetic material or, in other embodiments multiple layers. The free layer 284 may comprise Co, Fe, B, NiFe, CoFe, CoFeB or combinations thereof. The free layer 284 has a thickness of between about 15 Angstroms to about 75 Angstroms.

Figure 2D:
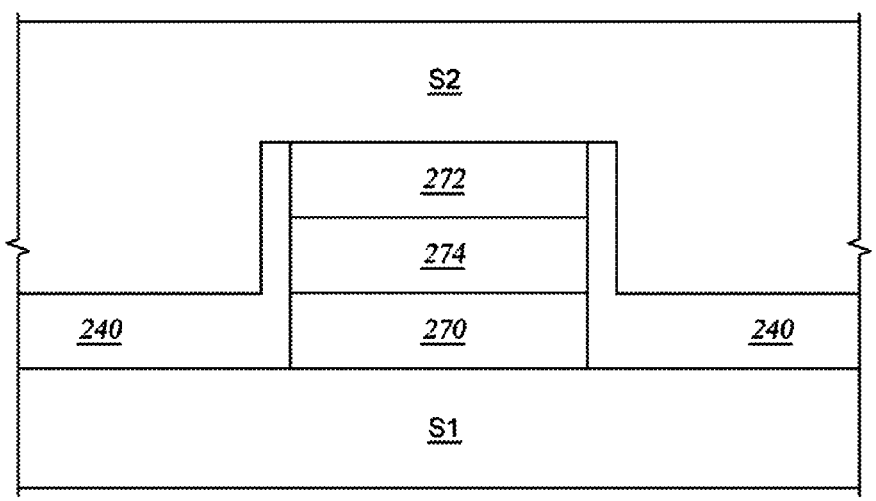
FIG. 2D is a schematic cross-sectional view of a CPP read head according to another embodiment.

FIG. 2D is a schematic cross-sectional view of a CPP read head 288 according to another embodiment. As shown in FIG. 2D, the read head 288 is similar to the read head from FIG. 2C, however, the bias layer 242 and capping layer 244 are not present. Rather, the head 288 has the second shield S2 disposed over the insulating layer 240 to create a soft magnetic bias where a side shield is present. In the embodiment shown in FIG. 2D, the second shield S2 is used as the side shield, but it is to be understood that a separate shield may be used instead of second shield S2. As shown in FIG. 2D, two readers are contemplated to be present in a soft bias CPP read head.

Figure 2E:
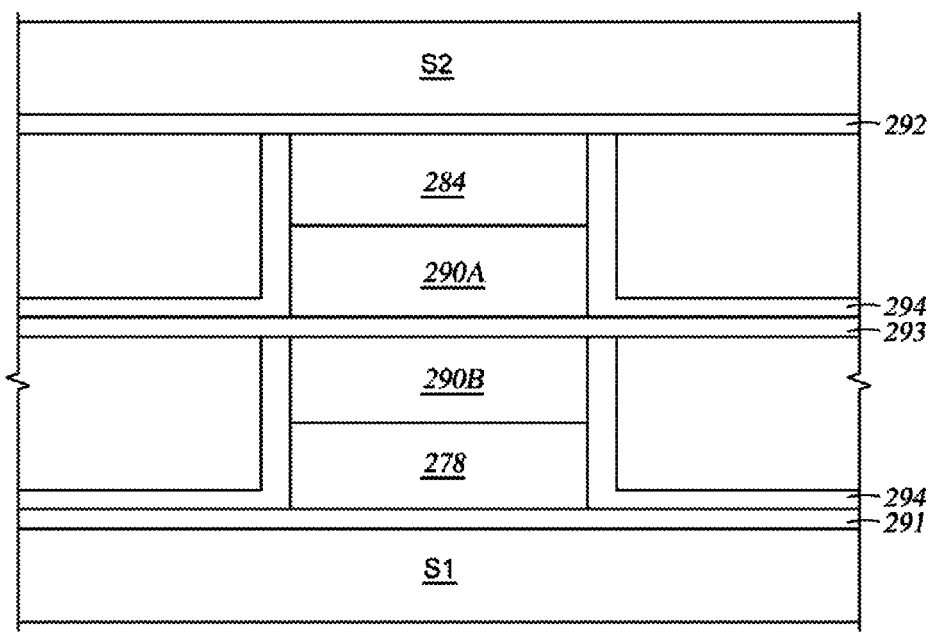
FIG. 2E is a schematic cross-sectional view of a current in plane (CIP) read head according to one embodiment.

FIG. 2E is a schematic cross-sectional view of a current-in-plane (CIP) read head 290 according to one embodiment. The read head has insulating layers 291, 292 between the shields S1, S2. Additionally, a center insulating layer 293 is present to isolate the sensors from each other. The sensors include the free magnetic layers 284, 278 together with the remainder sensor material 290A, 290B. A conductive layer 294, such as chromium, is used to separate the magnetic bias material (either soft or hard), from the sensors. As shown in FIG. 2E, two readers are contemplated to be present in a CIP read head.

Figure 2F:
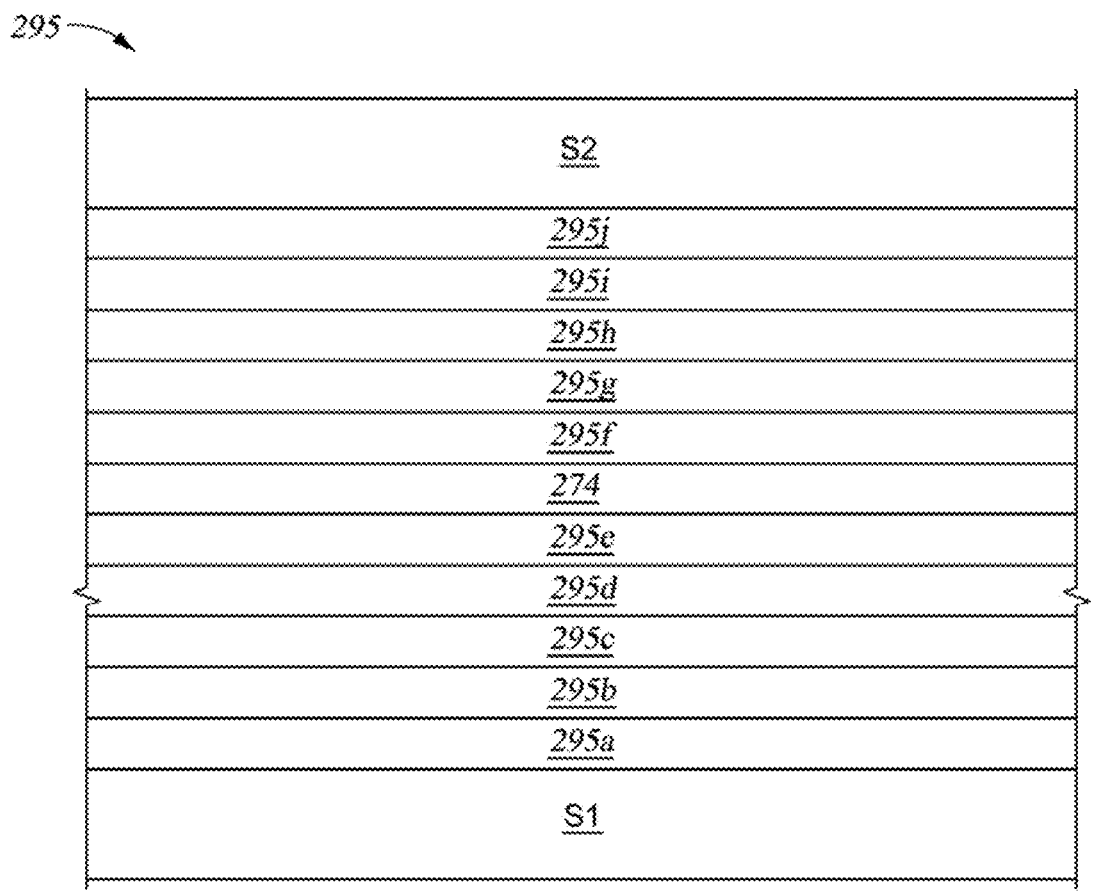
FIG. 2F is a schematic cross-sectional view of a CPP read head according to another embodiment.

FIG. 2F is a schematic cross-sectional view of a CPP read head 295 according to another embodiment. The read head 295 is utilizes a pair of scissor type sensors. The read head includes the two shields S1, S2 and the center lead 274. On either side of the center lead 274 are the two readers. The readers comprise underlayers 295a, 295f, bottom free layers 295b, 295g, spacer layers 295c, 295h, top free layers 295d, 295i, and capping layers 295e, 295j. As shown in FIG. 2F, two readers are contemplated to be present in a CPP scissor type read head.

FIG. 3A is a schematic cross-sectional illustration of a bottom TMR 272 according to one embodiment. The bottom TMR 272 is disposed on the center lead 274. The first layer of the bottom TMR 272 is an antiferromagnetic seed layer 302 that is disposed on the center lead 274. The seed layer 302 comprises Ru, NiMnO or Ta and has a thickness of about 20 Angstroms to about 30 Angstroms. The seed layer 302 may be deposited by a thin film deposition process such as DC magnetron sputtering. On the seed layer 302, an antiferromagnetic layer 304 is formed. The antiferromagnetic layer 304 comprises PtMn, IrMn, PtPdMn, NiMn or combinations thereof and has a thickness of about 60 angstroms. Similar to the seed layer 302, the antiferromagnetic layer 304 is deposited by a thin film deposition process such as DC magnetron sputtering.

A pinned magnetic layer 306 is deposited on the antiferromagnetic layer 304. The pinned magnetic layer 306 may comprise one of several types of pinned layers, such as a simple pinned, antiparallel pinned, self pinned or antiferromagnetic pinned sensor. For purposes of simplicity, the sensor will be described herein as a self pinned sensor having a pinned layer 306, a reference layer 310, and a non magnetic layer 308, such as Ru sandwiched therebetween. The pinned and reference layers 306, 310 can be constructed of several magnetic materials such as, for example NiFe, CoFe, CoFeB, or diluted magnetic alloys. The pinned magnetic layer 306 may have a thickness of between about 20 Angstroms and about 30 Angstroms and be deposited by a thin film deposition process such as DC magnetron sputtering. Similarly, the reference layer 310 may have a thickness of between about 20 Angstroms and about 40 Angstroms and be deposited by a thin film deposition process such as DC magnetron sputtering. The non magnetic layer 308 may be referred to as an antiparallel coupling layer and have a thickness of between about 5 Angstroms and about 10 Angstroms. The non magnetic layer 308 may comprise ruthenium and may be deposited by a thin film deposition process such as DC magnetron sputtering. An oxide barrier layer 312 is deposited on the reference layer 310. The oxide barrier layer 312 comprises an insulating material such as MgO, $HfO_2$, $TiO_2$ or $Al_2O_3$. The oxide barrier layer 312 is the insulator between the magnetic reference layer 310 and the magnetic free layer 284 and thus, functions as the tunnel barrier between the two magnetic layers.

FIG. 3B is a schematic cross-sectional illustration of a top TMR 270 according to one embodiment. The top TMR 270 comprises seed layer 276 and free layer 278. Additionally, an oxide barrier 352 comprising MgO, $HfO_2$, $TiO_2$ or $Al_2O_3$ is present on the free layer 278. The oxide barrier layer 352 is the insulator between the magnetic reference layer 354 and the magnetic free layer 278 and thus, functions as the tunnel barrier between the two magnetic layers. A magnetic reference layer 354, nonmagnetic layer 356 and pinned magnetic layer 358 are disposed on the oxide barrier 352. The pinned and reference layers 358, 354 can be constructed of several magnetic materials such as, for example NiFe, CoFe, CoFeB, or diluted magnetic alloys. The nonmagnetic layer 356 comprises ruthenium. The pinned magnetic layer 358 may have a thickness of between about 20 Angstroms and about 30 Angstroms and be deposited by a thin film deposition process such as DC magnetron sputtering. Similarly, the reference layer 354 may have a thickness of between about 20 Angstroms and about 40 Angstroms and be deposited by a thin film deposition process such as DC magnetron sputtering. The non magnetic layer 356 may be referred to as an antiparallel coupling layer and have a thickness of between about 5 Angstroms and about 10 Angstroms. The non magnetic layer 356 may comprise ruthenium and may be deposited by a thin film deposition process such as DC magnetron sputtering. An antiferromagnetic layer 360 is disposed on the pinned layer 358 and below the capping layer 362. The antiferromagnetic layer 362 comprises PtMn, IrMn, PtPdMn, NiMn or combinations thereof and has a thickness of about 60 angstroms. The antiferromagnetic layer 360 is deposited by a thin film deposition process such as DC magnetron sputtering. The capping layer 362 hafnium, ruthenium, tantalum and combinations thereof. The capping layer 362 has a thickness of between about 15 Angstroms and about 75 Angstroms.

The two reader elements are stacked in the down track direction within the same read gap to improve resolution and SNR by combining the signals from the two reader elements 270, 272. The output waveform from each read element is asymmetric in the down track, however, by use of equalizer settings and waveform combining, the combined waveform has similar or better resolution and higher SNR compared to a single read element in a smaller read gap.

The reader stack is highly asymmetric with respect to the free layer that produces the signal. The top pinned stack 270 and the bottom pinned stack 272 result in the free layer 278 of the top pinned stack 270 being closer to the bottom shield S1 and the free layer 284 of the bottom pinned stack 272 being closer to the top shield S2. By combining the waveform of the two readers, the resolution of the reader is given by the total of the closest distance between the free layers 278, 284 and the shields Si, S2. By using a top pinned stack 270 close to the bottom shield Si and using a bottom pinned stack 272 close to the top shield S2, the closest separation between free layers and the shields, and therefore, very high resolution is achieved. In fact, up to 3 dB of SNR gain is possible. In one embodiment, the distance between the free layer 284 of the bottom pinned stack 272 and the top shield S2 is equal to the distance between the free layer 278 of the top pinned stack 270 and the bottom shield S1.

A larger shield to shield spacing may be necessary to accommodate the two read elements 270, 272 within the same gap (i.e., area between shields S1, S2) compared to having only one read element in the gap. However, the two read elements 270, 272 are disposed in such a way whereby each of the free-layers 278, 284 are much closer to a shield S1, S2, even though the total shield to shield spacing may be larger to accommodate the two readers. Consequently, a better resolution and SNR gain occurs.

FIG. 3C is a schematic cross-sectional illustration of a bottom CPP GMR 370 according to one embodiment. FIG. 3D is a schematic cross-sectional illustration of a top CPP GMR 380 according to one embodiment. The GMRs are similar to the TMRs described above with regards to FIGS. 3A and 3B; however, rather than oxide barriers 312, 352, a conductive layer 372, 382 is present. In one embodiment, the conductive layer 372, 382 may comprise copper.

In order to set the pinned magnetic layers in the sensors, the sensors are annealed after deposition of the antiferromagnetic layers. The annealing may occur at temperatures below about 280 degrees Celsius. Because the top and bottom sensors are formed separately, the magnetization is set separately. As such, the top sensor can degrade when the bottom sensor is set. In order to avoid degrading the top sensor when the bottom sensor is set, different antiferromagnetic material may be used for each sensor.

Figure 4:
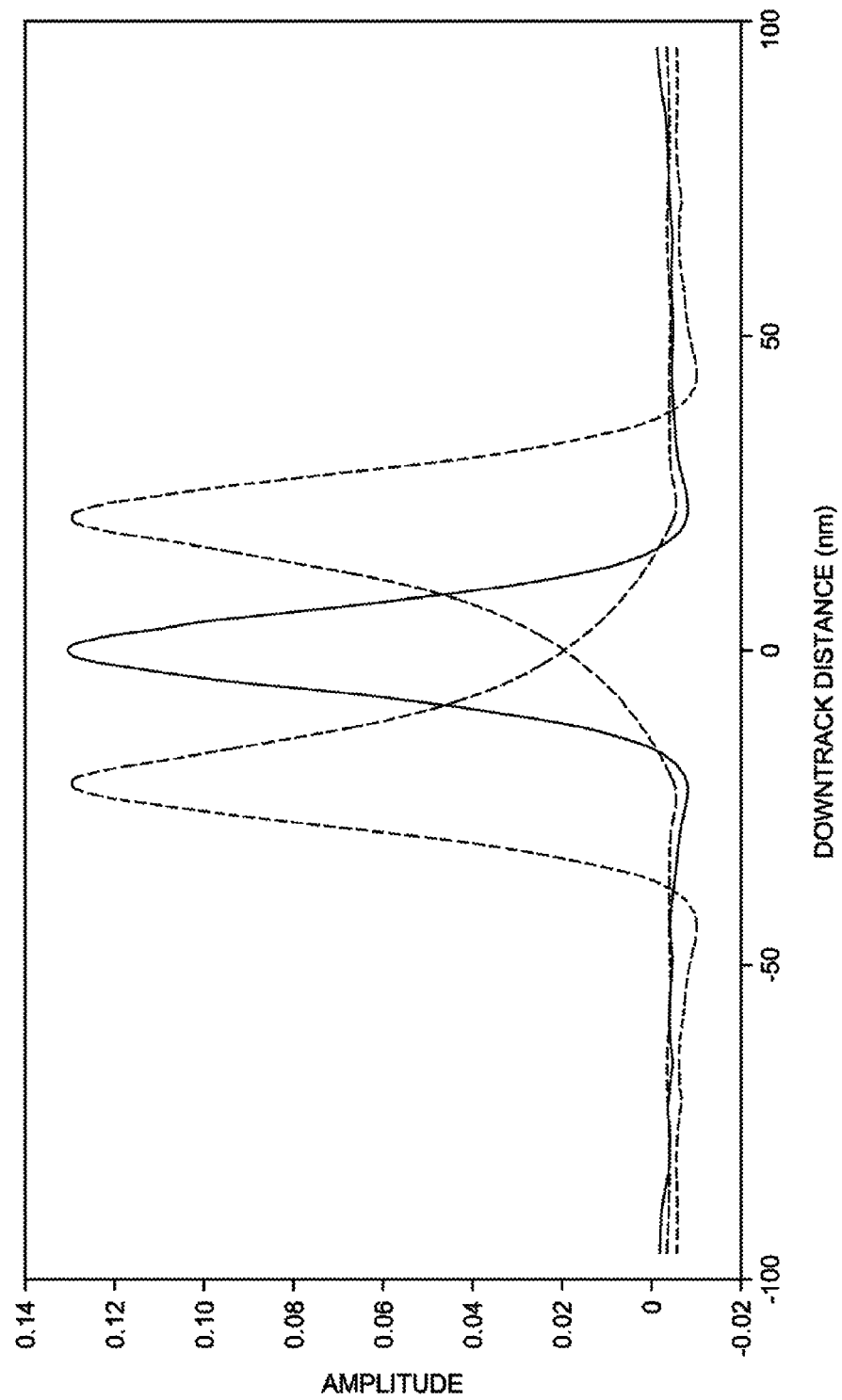
FIG. 4 is a graph showing a comparison of two reader element versus one reader element read heads.

FIG. 4 is a graph showing a comparison of a two reader elements read head versus a one reader element read head. An SNR gain of greater than 1 dB is present by using two read elements between a larger shield to shield spacing compared to a single read element in a smaller shield to shield spacing. The single read element is placed at the center of the shield to shield spacing resulting in a symmetric waveform shown by the solid line. When two read elements are used (shown by the dashed line), and the use of equalized waveform and waveform combining, the combined waveform results in a resolution that is identical to the case of the single reader. Because of the waveform combining, the noise is reduced. Because the two read elements in this read configuration are placed such that the separation between the free magnetic layer of each of the read elements to the nearest shield is the same as the separation between the single element and the shields. Specifically, by using two read head sensors between the two shields, and reducing the total distance between the free magnetic layer and the nearest shield, the read head has an improved SNR and resolution in the down-track direction.

While the foregoing is directed to embodiments of the present invention, other and further embodiments of the invention may be devised without departing from the basic scope thereof, and the scope thereof is determined by the claims that follow.

What is claimed is:

1. A magnetic read head, comprising:
   a first shield layer;
   a second shield layer, wherein the second shield layer comprises a ferromagnetic material;
   a first sensor element disposed between the first shield layer and the second shield layer;
   a second sensor element, separate and distinct from the first sensor element, disposed between the first shield layer and the second shield layer;
   an insulating layer disposed on the first shield layer and on sidewalls of the first and second sensor elements; and
   a magnetic bias layer disposed on and in contact with the insulating layer, wherein the magnetic bias layer is in contact with the ferromagnetic material of the second shield layer.

2. The magnetic read head of claim 1, wherein the first sensor element comprises:
   a first free magnetic layer;
   a first oxide barrier layer disposed on the first free magnetic layer;
   a first magnetic reference layer disposed on the first oxide barrier layer;
   a first nonmagnetic layer disposed on the first magnetic reference layer;
   a first pinned magnetic layer disposed on the first nonmagnetic layer; and
   a first antiferromagnetic layer disposed on the first pinned magnetic layer.

3. The magnetic read head of claim 2, wherein the first oxide barrier layer comprises MgO, $HfO_2$, $TiO_2$ or $Al_2O_3$.

4. The magnetic read head of claim 3, wherein the first magnetic reference layer comprises NiFe, CoFe, or CoFeB.

5. The magnetic read head of claim 4, wherein the first nonmagnetic layer comprises ruthenium.

6. The magnetic read head of claim 5, wherein the first free magnetic layer comprises NiFe, CoFe, or CoFeB.

7. The magnetic read head of claim 6, wherein the first antiferromagnetic layer comprises PtMn, IrMn, PtPdMn, NiMn or combinations thereof.

8. The magnetic read head of claim 7, wherein the second sensor element comprises:
   a second antiferromagnetic layer;
   a second pinned magnetic layer disposed on the second antiferromagnetic layer;
   a second nonmagnetic layer disposed on the second pinned magnetic layer;
   a second magnetic reference layer disposed on the second nonmagnetic layer;
   a second oxide barrier layer disposed on the second magnetic reference layer; and
   a second free magnetic layer disposed on the second oxide barrier layer.

9. The magnetic read head of claim 8, wherein the second oxide barrier layer comprises MgO, $HfO_2$, $TiO_2$ or $Al_2O_3$.

10. The magnetic read head of claim 9, wherein the second magnetic reference layer comprises NiFe, CoFe, or CoFeB.

11. The magnetic read head of claim 10, wherein the second nonmagnetic layer comprises ruthenium.

12. The magnetic read head of claim 11, wherein the second free magnetic layer comprises NiFe, CoFe, or CoFeB.

13. The magnetic read head of claim 12, wherein the second antiferromagnetic layer comprises PtMn, IrMn, PtPdMn, NiMn or combinations thereof.

14. The magnetic read head of claim 8, wherein the first antiferromagnetic layer and the second antiferromagnetic layer comprise different materials.

15. A magnetic read head, comprising:
   a first shield layer;
   a first sensor element disposed on the first shield layer;
   a center lead disposed on the first sensor element;
   a second sensor element disposed on the center lead; and
   a second shield layer disposed on the second sensor element, wherein the first sensor element comprises:
      a seed layer disposed on the first shield layer;
      a first free magnetic layer disposed on the seed layer;
      a first oxide barrier layer disposed on the first free magnetic layer, wherein the first oxide barrier layer comprises MgO, $HfO_2$, $TiO_2$ or $Al_2O_3$;

a first magnetic reference layer disposed on the first oxide barrier layer, wherein the first magnetic reference layer comprises NiFe, CoFe, or CoFeB;

a first nonmagnetic layer disposed on the first magnetic reference layer, wherein the first nonmagnetic layer comprises ruthenium;

a first pinned magnetic layer disposed on the first nonmagnetic layer, wherein the first free magnetic layer comprises NiFe, CoFe, or CoFeB; and a first antiferromagnetic layer disposed on the first pinned magnetic layer, wherein the first antiferromagnetic layer comprises PtMn, IrMn, PtPdMn, NiMn or combinations thereof.

16. The magnetic read head of claim 15, wherein the second sensor element comprises:

a second antiferromagnetic layer, wherein the second antiferromagnetic layer comprises PtMn, IrMn, PtPdMn, NiMn or combinations thereof;

a second pinned magnetic layer disposed on the second antiferromagnetic layer, wherein the second pinned magnetic layer comprises NiFe, CoFe, or CoFeB;

a second nonmagnetic layer disposed on the second pinned magnetic layer, wherein the second nonmagnetic layer comprises ruthenium;

a second magnetic reference layer disposed on the second nonmagnetic layer, wherein the second magnetic reference layer comprises NiFe, CoFe, or CoFeB; and a second oxide barrier layer disposed on the second magnetic reference layer, wherein the second oxide barrier layer comprises $MgO$, $HfO_2$, $TiO_2$ or $Al_2O_3$; and a second free magnetic layer disposed on the second oxide barrier layer.

17. The magnetic read head of claim 16, wherein the center lead comprises a nonmagnetic conductive material comprising copper, chromium, tantalum or tungsten.

18. The magnetic read head of claim 15, wherein the center lead is magnetic.

19. A magnetic read head, comprising:

a first shield layer;

a first sensor element disposed on the first shield layer, wherein the first sensor element comprises:

an underlayer disposed on and in contact with the first shield layer;

a first free magnetic layer disposed on and in contact with the underlayer, wherein the first free magnetic layer is disposed a first distance from the first shield layer;

a first oxide barrier layer disposed on and in contact with the first free magnetic layer wherein the first oxide barrier layer comprises $MgO$, $HfO_2$, $TiO_2$ or $Al_2O_3$;

a first magnetic reference layer disposed on and in contact with the first oxide layer, wherein the first magnetic reference layer comprises NiFe, CoFe, or CoFeB;

a first nonmagnetic layer disposed on and in contact with the first magnetic reference layer, wherein the first nonmagnetic layer comprises ruthenium;

a first pinned magnetic layer disposed on and in contact with the first nonmagnetic layer; and a first antiferromagnetic layer disposed on and in contact with the first pinned magnetic layer, wherein the first antiferromagnetic layer comprises PtMn, IrMn, PtPdMn, NiMn or combinations thereof;

a second shield layer disposed over the first sensor element; and a second sensor element disposed between the first sensor element and the second shield layer, the second sensor element having a second free layer, wherein the second free layer is disposed a second distance from the second shield layer and wherein the second distance is substantially equal to the first distance, and wherein the second sensor element comprises:

a second antiferromagnetic layer disposed on a seed layer, wherein the second antiferromagnetic layer comprises PtMn, IrMn, PtPdMn, NiMn or combinations thereof;

a second pinned magnetic layer disposed on the second antiferromagnetic layer;

a second nonmagnetic layer disposed on the second pinned magnetic layer, wherein the second nonmagnetic layer comprises ruthenium;

a second magnetic reference layer disposed on the second nonmagnetic layer, wherein the second magnetic reference layer comprises NiFe, CoFe, or CoFeB;

a second oxide barrier layer disposed on the second magnetic reference layer, wherein the second oxide barrier layer comprises $MgO$, $HfO_2$, $TiO_2$ or $Al_2O_3$; and the second free magnetic layer disposed on the second oxide barrier layer.

* * * * *

UNITED STATES PATENT AND TRADEMARK OFFICE
CERTIFICATE OF CORRECTION

PATENT NO. : 9,230,578 B2
APPLICATION NO. : 14/138804
DATED : January 5, 2016
INVENTOR(S) : Batra et al.

Page 1 of 1

It is certified that error appears in the above-identified patent and that said Letters Patent is hereby corrected as shown below:

In the Claims:

Column 9, Claim 19, Line 41, please delete "underlaver" and insert --underlayer-- therefor.

Signed and Sealed this
Twenty-sixth Day of April, 2016

Michelle K. Lee
*Director of the United States Patent and Trademark Office*